United States Patent [19]

Kobayakawa et al.

[11] Patent Number: 4,767,147
[45] Date of Patent: Aug. 30, 1988

[54] OPEN-TOP VEHICLE BODY

[75] Inventors: Takaharu Kobayakawa; Mikio Suehiro; Yosuke Saito; Hiroshi Inoue, all of Hiroshima, Japan

[73] Assignee: Mazda Motor Corporation, Hiroshima, Japan

[21] Appl. No.: 16,008

[22] Filed: Feb. 18, 1987

[30] Foreign Application Priority Data

Feb. 18, 1986 [JP] Japan .............................. 61-22356[U]

[51] Int. Cl.⁴ ............................................. B62D 25/00
[52] U.S. Cl. ..................................... 296/1 S; 296/107
[58] Field of Search ................. 296/1 S, 85, 1 R, 136, 296/107; 297/219, 220

[56] References Cited

U.S. PATENT DOCUMENTS

| 2,499,136 | 2/1950 | Edlund et al. | 296/85 |
| 2,502,538 | 4/1950 | Stark | 296/85 |
| 4,512,606 | 4/1985 | Trostle et al. | 296/136 |

Primary Examiner—Robert R. Song
Attorney, Agent, or Firm—Fleit, Jacobson, Cohn & Price

[57] ABSTRACT

An open-top vehicle body having a passenger compartment defined rearwards the front windshield. A shield member in the form of a thin flexible sheet is provided to extend transversely at a portion behind the front seats so as to block air flow which will otherwise be produced from the rear compartment to the front passenger compartment. The shield member is attached to the vehicle body in a removable manner.

19 Claims, 4 Drawing Sheets 4,767,147

OPEN-TOP VEHICLE BODY

BACKGROUND OF THE INVENTION

1. Field of the Invention

The present invention relates to a vehicle body and more particularly to an open-top vehicle body. More specifically, the present invention pertains to means for preventing air stream from blowing into the front passenger compartment while the vehicle is running.

2. Description of the Prior Art

Hithertofore, many types of convertible vehicles have been developed. These vehicles have roof structures which can be moved between an extended position where the roof structure covers the top portion of the vehicle body and a retracted position where the roof structure is retracted into the vehicle rear body section to open the top portion of the vehicle body. An example of such convertible vehicle body is shown by the U.S. Pat. No. 4,512,606.

In this type of convertible vehicle body, when the vehicle is operated with the roof structure retracted to open the top portion of the body, a turbulent air flow is produced in the rear top portion of the body and there is produced a stream which is directed from the rear part of the body forwardly to the front passenger compartment. Such forwardly directed air stream chills the passengers in the front seats so that the passengers very often hesitate to operate the vehicle with an open-top condition under a cold weather although a driving of an open-top vehicle is attractive. Further, the air stream may sometimes blow off articles such as documents or clothes which are placed on the front seat.

SUMMARY OF THE INVENTION

It is therefore an object of the present invention to provide an open-top or convertible vehicle body in which air stream directed from the rear part forwardly to the front passenger compartment can be prevented.

Another object of the present invention is to provide a vehicle body which can be operated with an open-top condition without producing an air stream which flows forwardly into the front passenger comparment.

A further object of the present invention is to provide an open-top or convertible type vehicle body having means for blocking air stream directed forwardly from the rear body section to the front passenger compartment.

According to the present invention, the above and other objects can be accomplished by an open-top vehicle body including a body structure comprising a front section provided with a front windshield, a middle section provided with side panel structures having upper edges defining side belt lines and a rear section, said body structure having a front passenger compartment defined rearwards the front windshield and a rear compartment defined rearwards the front passenger compartment, shield means extending transversely between the front passenger compartment and the rear compartment for blocking an air stream which flows from said rear compartment toward the front passenger compartment. As conventional in the art, the vehicle body may have roof means which normally covers the top portions of the front passenger compartment and the rear compartment and can be removed or folded rearwards to open the top portion. Front seats may be provided in the front passenger compartment. The rear compartment may be used as a package compartment or provided with rear seats for passengers.

The shield means may be in the form of a thin flexible sheet, such as a sheet made of a vinyl chloride, or alternatively, it may be constituted by a rigid panel. In case where the shield means is in the form of a thin flexible sheet, it may be attached to the vehicle body at the opposite ends of the upper edge. Additionally, the sheet may be attached to the vehicle body at the opposite side edges and the lower edge.

The above and other objects and features of the present invention will become apparent from the following descriptions of preferred embodiments taking reference to the accompanying drawings.

DESCRIPTION OF THE PREFERRED EMBODIMENTS

Figure 1:
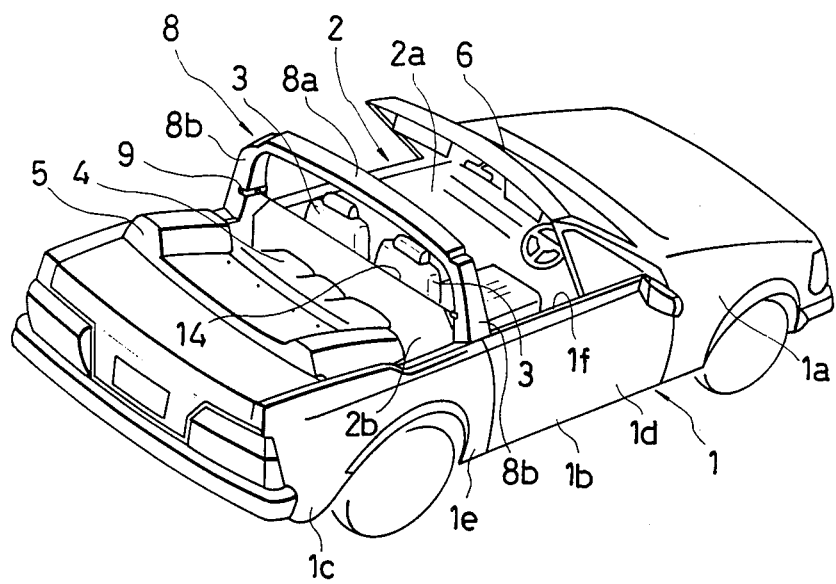
FIG. 1 is a perspective view of a convertible vehicle body in accordance with one embodiment of the present invention.

Referring now to the drawings, particularly to FIG. 1, there is shown a convertible type vehicle body including a body structure 1 comprising a front section 1a, a middle section 1b and a rear section 1c. The front body section 1a is provided with a front windshield 6. The middle section 1b includes side panels which may be side door panels 1d and rear fender panels 1e. In the body structure 1, there is defined a compartment 2 which includes a front passenger compartment 2a which is located rearwards the front windshield 6 and a rear compartment 2b which is located rearwards the front passenger compartment 2a. The side panels have upper edges which define side belt lines 1f of the vehicle body. As conventional in the art, transparent glass panels are provided in the door panels 1d and the rear fender panels 1e although FIG. 1 shows the vehicle body with these glass panels retracted into the panels. In the front passenger compartment 2a there are provided front passengers' seats 3. In the illustrated embodiment, the rear compartment 2b is provided with a rear seat 4 for rear passengers. It should however be noted that the rear compartment may be used as a package compartment without providing the rear seat.

The vehicle body has a foldable roof structure 5 which can be extended to cover the top portion of the compartment 2 and can be retracted into the rear body section 1c as shown in FIG. 1. A roll bar 8 of an inverted U-shaped configuration is provided to extend from the front end portions of the rear fender panels 1e. The roll bar 8 has a transversely extending top portion 8a and a pair of leg portions 8b which are secured at the lower ends to the front end portions of the rear fender panels 1e. The roll bar 8 is located just behind the front seats 3. In other words, the roll bar 8 is located substantially at the border between the front and rear compartments 2a and 2b.

Figure 2:
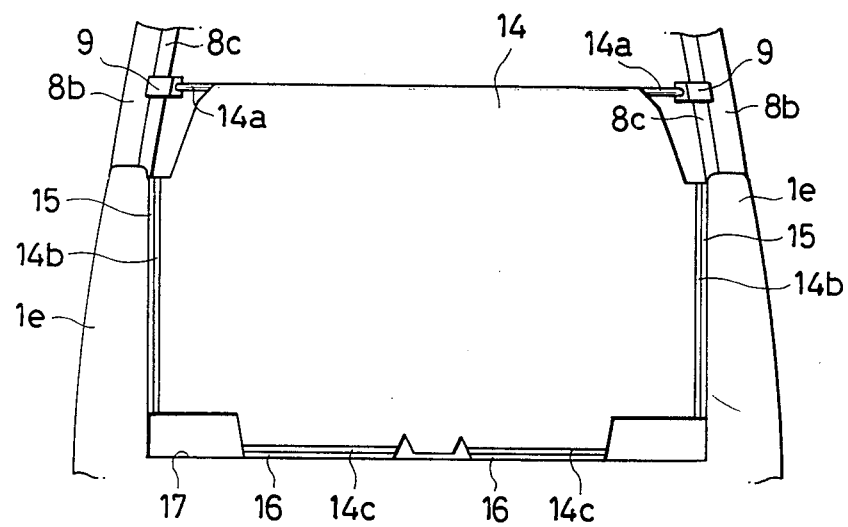
FIG. 2 is a front view of the air shielding sheet used in the embodiment shown in FIG. 1.

According to the features of the present invention, there is provided a shield sheet member 14 which extends transversely between the leg portions 8b of the roll bar 8. The sheet member 14 may be made of a sheet of vinyl chloride and, as shown in FIG. 2, has a pair of tying strings 14a at the opposite ends of the upper edge. The sheet members 14 further has side edges provided with Velcro type fasteners 14b and a lower edge provided also with Velcro type fasteners 14c.

Figure 3:
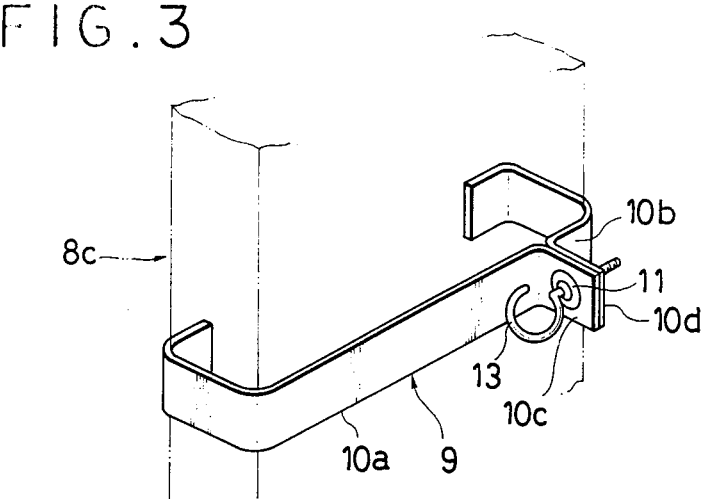
FIG. 3 is a perspective view of a fitting for securing the air shielding sheet to the vehicle body.
Figure 4:
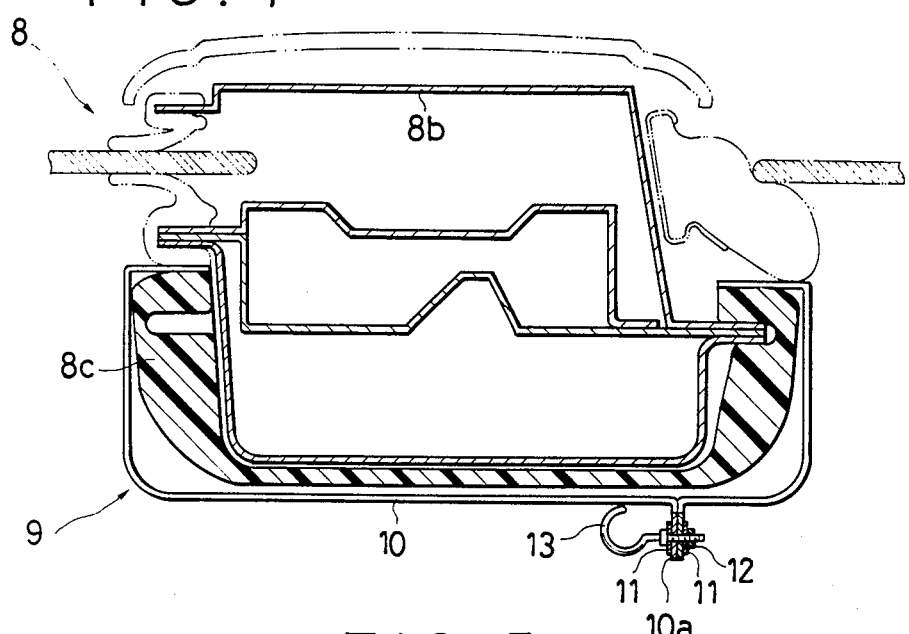
FIG. 4 is a top plan view of the fitting shown in FIG. 3.
Figure 5:
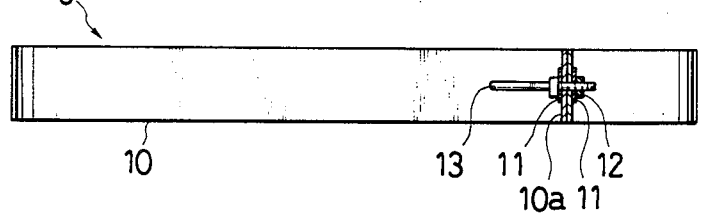
FIG. 5 is a side view of the fitting.

As shown in FIGS. 3 through 5, the roll bar 8 has an inner trim 8c which covers the inner surface of the roll bar 8. A fitting 9 comprising a front bracket 10a and a rear bracket 10b is attached to the inner trim of the roll bar at each leg portion 8b. The front bracket 10a is substantially of a J-shaped configuration having an end portion engaged with the front edge portion of the inner trim 8c at each leg portion 8b. The rear bracket 10b is of a substantially C-shaped configuration and engaged with the rear edge portion of the inner trim 8c of the roll bar 8 at each leg portion 8b. The brackets 10a and 10b respectively have flanges 10c and 10d which are connected together by a hook member 13 and a nut 12. Washers 11 may be used as necessary. The sheet member 14 is attached to the leg portions 8b of the roll bar 8 by tying the strings 14a to the hook members 13. The side edges and the lower edge of the sheet member 14 are secured to the middle section 1b of the body 1 by having the Velcro fasteners 14b and 14c engaged with corresponding fastener elements 15 and 16 provided on the inner panels of the rear fender panels 1e and the floor panel 17.

Figure 6:
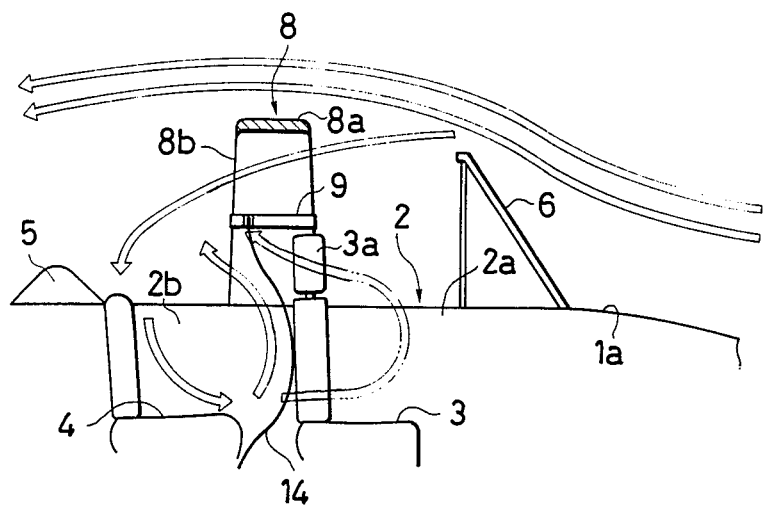
FIG. 6 is a schematic side view of the vehicle body showing the air streams.

Referring to FIG. 6, when the vehicle is running with the roof panel structure retracted into the vehicle rear body section 1c, there will be produced turbulent flows of air stream in the rearward portion of the front windshield 6. As the result, a portion of the turbulent flows tends to be directed forwardly from the rear compartment 2b into the front compartment 2a as shown by phantom lines. It should be noted, however, that the shield member 14 functions to block such forwardly directed flow so that the front passenger compartment 2a can be maintained substantially free from such air stream. It is therefore possible to prevent the front passengers from being chilled by the air stream particularly in a cold weather and/or the articles laid on the front seat 3 from being blown off.

It is preferable that the shield member 14 is as high as possible for the purpose of blocking the air flow. It should however be noted that the shield member should not be so high that it may disturb the rear view of the driver. Thus, it is preferable that the shield member 14 is lower than head rests 3a of the front seats 3 but higher than the belt line 1f. In any event, the shield member 14 extends transversely so that it covers the clearance between the two front seats 3.

Figure 7:
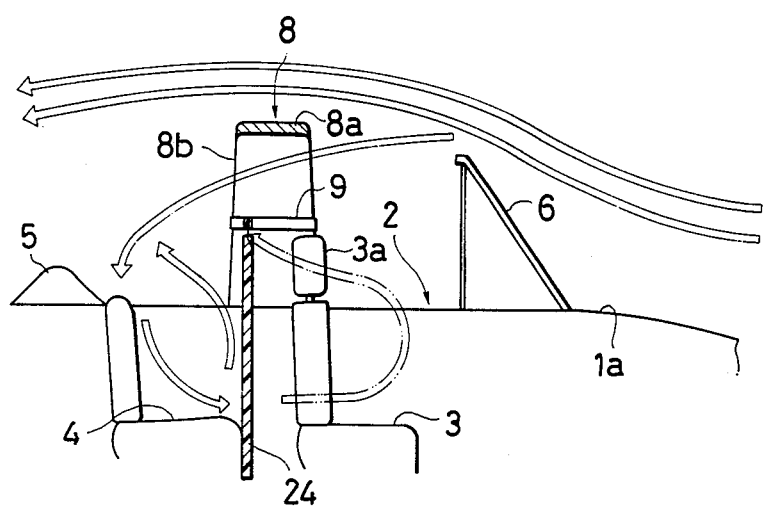
FIG. 7 is a side view showing another embodiment of the present invention.
Figure 8:
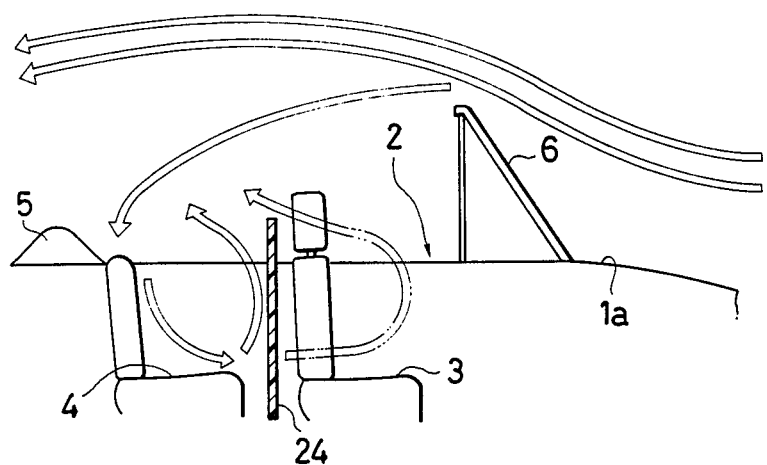
FIG. 8 is a side view showing another embodiment of the present invention.
Figure 9:
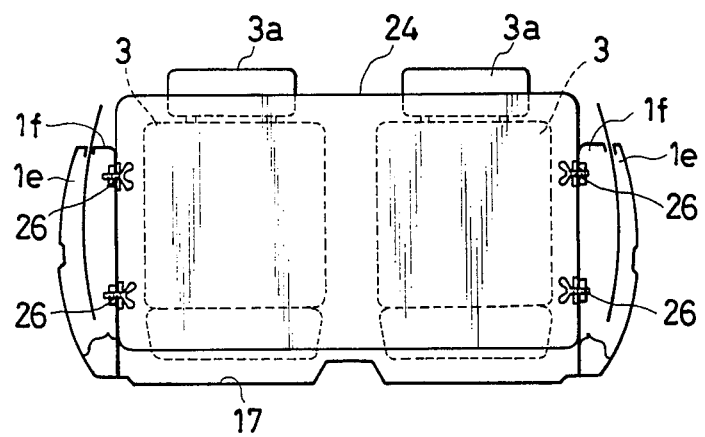
FIG. 9 is a rear view of the embodiment shown in FIG. 8.

Referring to FIG. 7, the embodiment shown therein includes a shield member 24 which is made of a rigid panel such as a hard plastic panel. A suitable fasteners may be provided for attaching the shield member 24 to the vehicle body 1. FIGS. 8 and 9 show a further embodiment which is similar to the embodiment shown in FIG. 7 except that the vehicle body does not have a roll bar as in the previous embodiments. The effects of the shield member 24 is the same as in the previous embodiments. As shown in FIG. 9, the shield member 24 is attached removably to the rear fender panels 1e by means of fasteners 26. This structure can also be adopted by the embodiment in FIG. 7. The shield member 24 is located so that the upper edge is above the belt line 1f but below the upper edge of the head rest 3a of the front seat 3.

The invention has thus been shown and described with reference to specific embodiments, however, it should be noted that the invention is in no way limited to the details of the illustrated structures but changes and modifications may be made without departing from the appended claims.

We claim:

1. An open-top vehicle body including a body structure comprising a front section provided with a front windshield, a middle section provided with side panel structures having upper edges defining side belt lines and a rear section, said body structure having a front windshield and a rear compartment defined rearwards the front passenger compartment, shield means extending transversely between the front passenger compartment and the rear compartment for blocking an air stream which flows from said rear compartment toward the front passenger compartment in which said shield means has an upper end located higher than the belt line of the body but not higher than a highest point of front seat means positioned in the front passenger compartment.

2. An open-top vehicle body in accordance with claim 1 in which said shield means is in the form of a flexible sheet having an upper edge secured to the vehicle body.

3. An open-top vehicle body in accordance with claim 1 in which a pair of front seat is provided in a side-by-side relationship, said shield means having a transverse extent which is sufficient to cover a clearance between the front seats.

4. An open-top vehicle body in accordance with claim 1 in which said shield means includes a rigid panel which extends transversely between said front passenger compartment and said rear compartment.

5. An open-top vehicle body including a body structure comprising a front windshield and a compartment defined rearwards the front windshield, side panel structures provided at the opposite sides of said compartment and having upper edges defining side belt lines, shield means extending transversely in the compartment to divide the compartment for blocking an air stream which flows from a rear portion of said compartment forwardly to a front portion of said compartment, said shield means having a portion located below the side belt lines for blocking an air stream which is drawn into said rear portion of said compartment and flows toward the front portion.

6. An open-top vehicle body in accordance with claim 5 in which said body includes a roll bar of substantially inverted U-shaped configuration having a pair of leg portions secured to the body, said shield means including a rigid panel having an upper edge tied to said leg portions of the roll bar.

7. An open-top vehicle body in accordance with claim 5 in which said body includes a roll bar of substantially inverted U-shaped configuration having a pair of leg portions secured to the body, said shield means including a thin flexible member having an upper edge tied to said leg portions of the roll bar.

8. An open-top vehicle body in accordance with claim 7 in which said leg portion of the roll bar is provided with a fitting having a hook portion, said upper edge of the thin flexible member is tied at each end with said hook portion of the fitting.

9. An open-top vehicle body in accordance with claim 8 in which said thin flexible member has side edges and a lower edge which are attached to the body by fastening means.

10. An open-top vehicle body in accordance with claim 5 in which said shield means is removably attached to the body.

11. An open-top vehicle body in accordance with claim 3 in which said shield member has a transverse width which is substantially the same as a transverse width of the compartment in the body.

12. An open-top vehicle body in accordance with claim 5 which includes a pair of seats provided in said compartment in transversely aligned positions with spacings between said pair of seats and between each seat and each of said side panel structures, said portion of the shield means being positioned rearwards the spacings so that the air stream through said spacings is blocked by the portion of the shield means.

13. An open-top vehicle body in accordance with claim 5 which includes seat means provided in said front portion of the compartment with spacings between said seat means and said side panel structures, said portion of the shield means being positioned rearwards the spacings so that the air stream through said spacings is blocked by the portion of the shield means.

14. An open-top vehicle body in accordance with claim 12 in which said shield means has an upper edge located substantially at a top edge portion of said seat means.

15. An open-top vehicle body including a body structure comprising a front windshield and a compartment defined rearwards the front windshield, side panel structures provided at the opposite sides of said compartment and having upper edges defining side belt lines, a pair of seats provided in a front portion of compartment in a transversely aligned relationship with a spacing between said seats, shield means extending transversely in the compartment rearwards the spacing between the seats for blocking an air stream which flows from a rear portion of said compartment forwardly to the front portion of said compartment through said spacing.

16. An open-top vehicle body in accordance with claim 15 in which spacings are also provided between the side panel structures and the seats, said shield means having portions located rearwards the spacings between the seats and the side panel structures to block an air stream therethrough.

17. An open-top vehicle body in accordance with claim 15 in which said shield means has an upper edge positioned substantially at a level of top edge portions of the seats.

18. An open-top vehicle body in accordance with claim 17 in which said upper edge of the shield means is lower than an upper edge of the windshield means.

19. An open-top vehicle body in accordance with claim 17 in which said upper edge of the shield means is higher than the belt line.

* * * * *